United States Patent
Basavaiah et al.

(10) Patent No.: US 11,593,095 B2
(45) Date of Patent: Feb. 28, 2023

(54) UPGRADE OF A DISTRIBUTED SERVICE IN A VIRTUALIZED COMPUTING SYSTEM

(71) Applicant: VMWARE, INC., Palo Alto, CA (US)

(72) Inventors: Murali Basavaiah, Palo Alto, CA (US); Anand Parthasarathy, Palo Alto, CA (US); Ravindra Kumar Tholiya, Bangalore (IN); Narasimhan Mandeyam, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/166,058

(22) Filed: Feb. 3, 2021

(65) Prior Publication Data
US 2022/0137956 A1  May 5, 2022

(30) Foreign Application Priority Data
Oct. 30, 2020  (IN) ............................. 202041047476

(51) Int. Cl.
*G06F 8/656* (2018.01)
*G06F 9/455* (2018.01)

(52) U.S. Cl.
CPC .......... *G06F 8/656* (2018.02); *G06F 9/45541* (2013.01)

(58) Field of Classification Search
CPC .. G06F 8/60–66; G06F 9/455; G06F 9/45533; G06F 9/45541; G06F 9/45558
USPC .................................................. 717/168–178
See application file for complete search history.

(56) References Cited

U.S. PATENT DOCUMENTS

| | | | | |
|---|---|---|---|---|
| 5,964,886 A | * | 10/1999 | Slaughter | G06F 11/201 709/212 |
| 7,688,795 B2 | * | 3/2010 | Doshi | H04L 67/04 370/338 |
| 9,740,472 B1 | * | 8/2017 | Sohi | G06F 8/65 |
| 10,045,427 B2 | * | 8/2018 | Vangeel | F24F 11/62 |
| 10,180,809 B2 | * | 1/2019 | Fetik | G06F 9/445 |

(Continued)

OTHER PUBLICATIONS

Gey, Fatih, et al., Evolving Multi-tenant SaaS Applications through Self-Adaptive Upgrade Enactment and Tenant Mediation, Procs of the 11th Int'l Symposium on Software Engineering for Adaptive and Self-Managing Systems, 2016, 7 pages, [retrieved on Nov. 30, 2022], Retrieved from the Internet: <URL:http://dl.acm.org/>.*

(Continued)

*Primary Examiner* — Geoffrey R St Leger
(74) *Attorney, Agent, or Firm* — Kim & Stewart LLP

(57) ABSTRACT

An example method of performing an upgrade operation for a distributed service in a virtualized computing system is described. The virtualized computing system includes a host cluster, the host cluster having hosts and a virtualization layer executing on hardware platforms of the hosts. The method includes: receiving, at a controller of the distributed service, a first upgrade operation from a user, the distributed service including the controller and a plurality of service engine groups, each of the plurality of service engine groups including a plurality of service engines; and performing, by the controller, the first upgrade operation on software of the controller exclusive of software of the service engines in each of the service engine groups, the software of the controller and the software of the plurality of service engines in each of the plurality of service engine groups executing in a plurality of hosts.

17 Claims, 5 Drawing Sheets

(56) References Cited

U.S. PATENT DOCUMENTS

| | | | | |
|---|---|---|---|---|
| 10,261,775 | B1* | 4/2019 | Ramsay | G06F 9/45558 |
| 11,132,215 | B2* | 9/2021 | Kunt | G06F 3/0635 |
| 2008/0126498 | A1* | 5/2008 | Doshi | G06F 8/656 |
| | | | | 709/208 |
| 2012/0266162 | A1* | 10/2012 | Baron | G06F 9/45558 |
| | | | | 718/1 |
| 2016/0095191 | A1* | 3/2016 | Vangeel | H04B 10/116 |
| | | | | 315/294 |
| 2017/0364345 | A1* | 12/2017 | Fontoura | G06F 9/5072 |
| 2018/0136960 | A1* | 5/2018 | Zhang | G06F 8/65 |
| 2019/0317796 | A1* | 10/2019 | Kunt | H04L 41/0806 |

OTHER PUBLICATIONS

Van Landuyt, Dimitri, et al., Middleware for Dynamic Upgrade Activation and Compensations in Multi-tenant SaaS, International Conference on Service-Oriented Computing ICSOC 2017: Service-Oriented Computing, 2017, 9 pages, [retrieved on Nov. 30, 2022], Retrieved from the Internet: <URL:https://link.springer.com/>.*

* cited by examiner

UPGRADE OF A DISTRIBUTED SERVICE IN A VIRTUALIZED COMPUTING SYSTEM

RELATED APPLICATIONS

Benefit is claimed under 35 U.S.C. 119(a)-(d) to Foreign Application Serial No. 202041047476 filed in India entitled "UPGRADE OF A DISTRIBUTED SERVICE IN A VIRTUALIZED COMPUTING SYSTEM", on Oct. 30, 2020, by VMware, Inc., which is herein incorporated in its entirety by reference for all purposes.

Applications today are deployed onto a combination of virtual machines (VMs), containers, application services, and more within a software-defined datacenter (SDDC). The SDDC includes a server virtualization layer having clusters of physical servers that are virtualized and managed by virtualization management servers. A virtual infrastructure administrator ("VI admin") interacts with a virtualization management server to create server clusters ("host clusters"), add/remove servers ("hosts") from host clusters, deploy/move/remove VMs on the hosts, deploy/configure networking and storage virtualized infrastructure, and the like. Each host includes a virtualization layer (e.g., a hypervisor) that provides a software abstraction of a physical server (e.g., central processing unit (CPU), random access memory (RAM), storage, network interface card (NIC), etc.) to the VMs. The virtualization management server sits on top of the server virtualization layer of the SDDC, which treats host clusters as pools of compute capacity for use by applications.

In the SDDC, infrastructure can be implemented using distributed services. For example, the SDDC can include various distributed network services, such as load balancer services. The distributed services include software components in the virtualization layer distributed across hosts in the host cluster. A distributed service can include a centralized controller executing in a VM in the host cluster or external to the host cluster. A distributed service can be logically divided among tenants, business units, and/or applications. Difficulty arises when such distributed services need to be updated. The existing paradigm treats the entire distributed service infrastructure as a single monolithic framework. The user is forced to upgrade the entire infrastructure even if the upgrade is not applicable to various tenants, business units, and/or applications. The monolithic upgrade approach is not conducive for multi-tenant environments (e.g., cloud environments) since each tenant may have different requirements. The monolithic upgrade approach does not lend itself to canary upgrades or sand-box approaches to mitigate risk, making the system less fault-tolerant.

SUMMARY

In an embodiment, a method of performing an upgrade operation for a distributed service in a virtualized computing system is described. The virtualized computing system includes a host cluster, the host cluster having hosts and a virtualization layer executing on hardware platforms of the hosts. The method includes: receiving, at a controller of the distributed service, a first upgrade operation from a user, the distributed service including the controller and a plurality of service engine groups, each of the plurality of service engine groups including a plurality of service engines; and performing, by the controller, the first upgrade operation on software of the controller exclusive of software of the plurality of service engines in each of the plurality of service engine groups, the software of the controller executing in at least one host, the software of the plurality of service engines in each of the plurality of service engine groups executing in a plurality of hosts.

Further embodiments include a non-transitory computer-readable storage medium comprising instructions that cause a computer system to carry out the above methods, as well as a computer system configured to carry out the above methods.

DETAILED DESCRIPTION

Techniques for upgrade operations on a distributed service in a virtualized computing system are described. In embodiments described herein, a virtualized computing system includes a software-defined datacenter (SDDC) comprising a server virtualization platform integrated with a logical network platform. The server virtualization platform includes clusters of physical servers ("hosts" or "servers") referred to as "host clusters." Each host includes a virtualization layer, executing on the hardware platform of the host, which supports execution of virtual machines (VMs). A virtualization management server manages host clusters, the virtualization layers, and the VMs executing thereon. Infrastructure for the SDDC can be implemented using distributed services, such as distributed network services. An example distributed network service described herein is a distributed load balance. A distributed service includes software distributed throughout the host cluster, such as in a plurality of VMs and/or as agents in the virtualization layer. In embodiments, a distributed service includes a centralized controller that manages a data plane. The "controller" comprises software executing in a host. The data plane includes a plurality of service engines organized into service engine groups. The service engine groups can be tenant-aware such that each service engine group is assigned to a particular tenant (e.g., a business unit, a customer, etc.). The centralized controller facilitates upgrade operations of the distributed service in a flexible, non-monolithic manner. In embodiments, upgrade operations are applied to the controller independent and exclusive of the service engine groups. Likewise, upgrade operations are applied to the service engine groups independent and exclusive of the controller. Further, upgrade operations can be applied to selected service engine groups those of particular tenants) independent and exclusive of non-selected service engine groups. These and further advantages and aspects of the disclosed techniques are described below with respect to the drawings.

Figure 1:
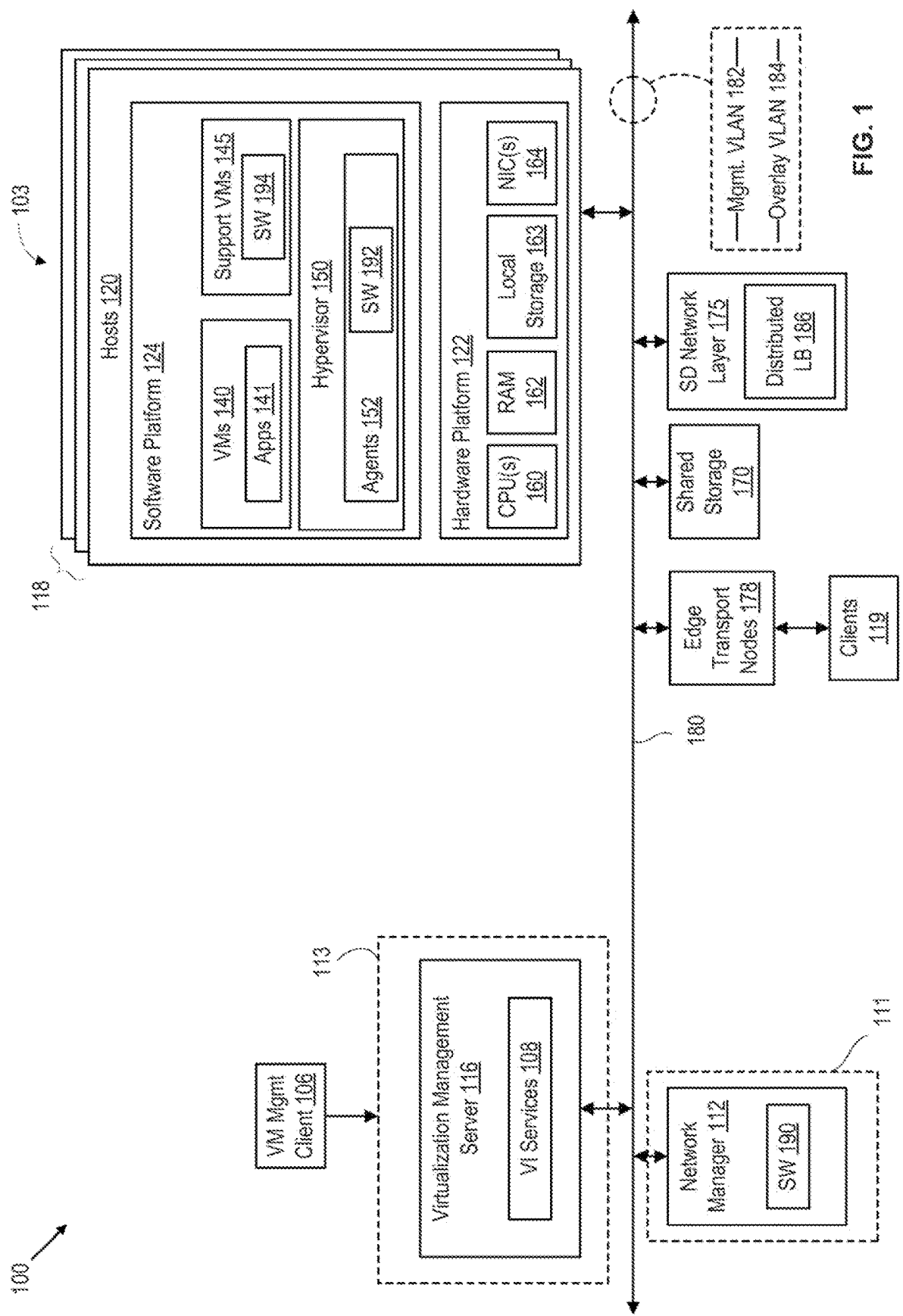
FIG. 1 is a block diagram of a clustered computer system in which embodiments may be implemented.

FIG. 1 is a block diagram of a virtualized computing system 100 in which embodiments described herein may be implemented. System 100 includes a cluster of hosts 120

("host cluster 118") that may be constructed on server-grade hardware platforms such as an x86 architecture platforms. For purposes of clarity, only one host cluster 118 is shown. However, virtualized computing system 100 can include many of such host clusters 118. As shown, a hardware platform 122 of each host 120 includes conventional components of a computing device, such as one or more central processing units (CPUs) 160, system memory (e.g., random access memory (RAM) 162), one or more network interface controllers (NICs) 164, and optionally local storage 163. CPUs 160 are configured to execute instructions, for example, executable instructions that perform one or more operations described herein, which may be stored in RAM 162. NICs 164 enable host 120 to communicate with other devices through a physical network 180. Physical network 180 enables communication between hosts 120 and between other components and hosts 120 (other components discussed further herein). Physical network 180 can include a plurality of VLANs to provide external network virtualization as described further herein.

In the embodiment illustrated in FIG. 1, hosts 120 access shared storage 170 by using NICs 164 to connect to network 180. In another embodiment, each host 120 contains a host bus adapter (HBA) through which input/output operations (IOs) are sent to shared storage 170 over a separate network (e.g., a fibre channel (PC) network). Shared storage 170 include one or more storage arrays, such as a storage area network (SAN), network attached storage (NAS), or the like. Shared storage 170 may comprise magnetic disks, solid-state disks, flash memory, and the like as well as combinations thereof. In some embodiments, hosts 120 include local storage 163 (e.g., hard disk drives, solid-state drives, etc.). Local storage 163 in each host 120 can be aggregated and provisioned as part of a virtual SAN, Which is another form of shared storage 170.

A software platform 124 of each host 120 provides a virtualization layer, referred to herein as a hypervisor 150, which directly executes on hardware platform 122. In an embodiment, there is no intervening software, such as a host operating system (OS), between hypervisor 150 and hardware platform 122. Thus, hypervisor 150 is a Type-1 hypervisor (also known as a "bare-metal" hypervisor). As a result, the virtualization layer in host cluster 118 (collectively hypervisors 150) is a bare-metal virtualization layer executing directly on host hardware platforms. Hypervisor 150 abstracts processor, memory, storage, and network resources of hardware platform 122 to provide a virtual machine execution space within which multiple virtual machines (VM) may be concurrently instantiated and executed. One example of hypervisor 150 that may be configured and used in embodiments described herein is a VMware ESXi™ hypervisor provided as part of the VMware vSphere® solution made commercially available by VMware, Inc. of Palo Alto, Calif. Hypervisor 150 supports execution of virtual machines (VMs) 140 and support VMs 145.

In the example of FIG. 1, VMs 140 support applications 141 deployed onto host cluster 118, which can include containerized applications or applications executing directly on guest operating systems (non-containerized). Support VMs 145 have specific functions within host cluster 118. For example, support VMs 145 can provide control plane functions, edge transport functions, and the like.

Host cluster 118 is configured with a software-defined (SD) network layer 175. SD network layer 175 includes logical network services executing on virtualized infrastructure in host cluster 118. The virtualized infrastructure that supports the logical network services includes hypervisor-based components, such as resource pools, distributed switches, distributed switch port groups and uplinks, etc., as well as VM-based components, such as router control VMs, load balancer VMs, edge service VMs, etc. Logical network services include logical switches, logical routers, logical firewalls, logical virtual private networks (VPNs), logical load balancers, and the like, implemented on top of the virtualized infrastructure. In embodiments, virtualized computing system 100 includes edge transport nodes 178 that provide an interface of host cluster 118 to an external network (e.g., a corporate network, the public Internet, etc.), Edge transport nodes 178 can include a gateway between the internal logical networking of host cluster 118 and the external network. Edge transport nodes 178 can be physical servers or VMs. For example, edge transport nodes 178 can be implemented in support VMs 145 and include a gateway of SD network layer 175. Various clients 119 can access service(s) virtualized computing system through edge transport nodes 178.

Virtualization management server 116 is a physical_ or virtual server that manages host cluster 118 and the virtualization layer therein. Virtualization management server 116 installs agent(s) 152 in hypervisor 150 to add a host 120 as a managed entity. Virtualization management server 116 logically groups hosts 120 into host cluster 118 to provide cluster-level functions to hosts 120, such as VM migration between hosts 120 (e.g., for load balancing), distributed power management, dynamic VM placement according to affinity and anti-affinity rules, and high-availability. The number of hosts 120 in host cluster 118 may be one or many. Virtualization management server 116 can manage more than one host cluster 118.

In an embodiment, virtualized computing system 100 further includes a network manager 112. Network manager 112 is a physical or virtual server that orchestrates SD network layer 175. In an embodiment, network manager 112 comprises one or more virtual servers deployed as VMs. Network manager 112 installs additional agents 152 in hypervisor 150 to add a host 120 as a managed entity, referred to as a transport node. In this Manner, host cluster 118 can be a cluster 103 of transport nodes. One example of an SD networking platform that can be configured and used in embodiments described herein as network manager 112 and SD network layer 175 is a VMware NSX® platform made commercially available by VMware, Inc. of Palo Alto, Calif.

Network manager 112 can deploy one or more transport zones in virtualized computing system 100, including VLAN transport zone(s) and an overlay transport zone. A VLAN transport zone spans a set of hosts 120 (e.g., host cluster 118) and is backed by external network virtualization of physical network 180 (e.g., a VLAN). One example VLAN transport zone uses a management VLAN 182 on physical network 180 that enables a management network connecting hosts 120 and the VI control plane (e.g., virtualization management server 116 and network manager 112). An overlay transport zone using overlay VLAN 184 on physical network 180 enables an overlay network that spans a set of hosts 120 (e.g., host cluster 118) and provides internal network virtualization using software components (e.g., the virtualization layer and services executing in VMs), Host-to-host traffic for the overlay transport zone is carried by physical network 180 on the overlay \FLAN 184 using layer-2-over-layer-3 tunnels. Network manager 112 can configure: SD network layer 175 to provide a cluster network using the overlay network. The overlay transport zone can be extended into at least one of edge transport nodes 178 to provide ingress/egress between cluster network and an external network.

Virtualization management server 116 implements a virtual infrastructure (VI) control plane 113 of virtualized computing system 100. VI control plane 113 controls aspects of the virtualization layer for host cluster 118 (e.g., hypervisor 150). Network manager 112 implements a network control plane 111 of virtualized computing system 100. Network control plane 111 controls aspects SD network layer 175.

Virtualization management server 116 can include VI services 108. VI services 108 include various virtualization management services, such as a distributed resource scheduler (DRS), high-availability (HA) service, single sign-on (SSO) service, virtualization management daemon, and the like. DRS is configured to aggregate the resources of host cluster 118 to provide resource pools and enforce resource allocation policies. DRS also provides resource management in the form of load balancing, power management, VM placement, and the like. HA service is configured to pool VMs and hosts into a monitored cluster and, in the event of a failure, restart VMs on alternate hosts in the cluster. A single host is elected as a master, which communicates with the HA service and monitors the state of protected VMs on subordinate hosts. The HA service uses admission control to ensure enough resources are reserved in the cluster for VM recovery when a host fails. SSO service comprises security token service, administration server, directory service, identity management service, and the like configured to implement an SSO platform for authenticating users. The virtualization management daemon is configured to manage objects, such as data centers, clusters, hosts, VMs, resource pools, datastores, and the like.

A VI admin can interact with virtualization management server 116 through a VM management client 106. Through VM management client 106, a VI admin commands virtualization management server 116 to form host cluster 118, configure resource pools, resource allocation policies, and other cluster-level functions, configure storage and networking, and the like.

In embodiments, virtual infrastructure in virtualized computing system 100 is implemented using one or more distributed services. A distributed service can include software executing on a controller, as agents 152 in hypervisor 150, or as software executing in a VM (e.g., support VM(s) 145), or some combination thereof. For example, a distributed network service, such as a distributed load balancing service, can provide distributed load balancer 186 in SD network layer 175. Distributed load balancer 186 can be implemented using one or more support VMs 145 and a controller, such as network manager 112, In some embodiments, distributed load balancer 186 can further include agents 152 in hypervisor 150. Distributed load balancer 186 is configured to distribute network traffic across multiple applications 141 executing in VMs 140. For example, an application can include a plurality of replicas executing in different VMs 140 and/or different hosts 120. Users can access the application using clients 119, which in turn communicate with edge transport nodes 178. Edge transport nodes 178 send ingress traffic to distributed load balancer 186, which in turn sends the ingress traffic to a selected replica of the application while ensuring that the load is balanced across the replicas.

The software implementing distributed load balancer 186 is distributed throughout virtualized computing system 100. For example, the software can include software 190 in network manager 112, software 192 in hypervisor 150, software 194 in support VMs 145, or some combination thereof. Software 190 comprises a centralized controller that can install, configure, and control software 192 and 194 distributed throughout host cluster 118. Software 192 and/or software 194 includes a data plane that processes the traffic for load balancing. While software 190 for the centralized controller is shown as executing in network manager 112, in other embodiments, software 190 can execute in a separate controller a load balancer controller). In some embodiments, distributed load balancer 186 is a multi-tenant service. For example, host cluster 118 can service multiple tenants, which can be different business units, different customers, and the like. Each tenant can have applications deployed that utilize load balancing provided by distributed load balancer 186. In such case, each tenant can have software 194 and/or software 192 dedicated for that tenant (e.g., a portion of the data plane of distributed load balancer 186 dedicated to that tenant).

In embodiments, a user can interact with software 190 of distributed load balancer 186 to perform upgrade operations. As used herein, upgrade operations include upgrading, patching, or rolling back of an upgrade/patch for software 190, software 192, and/or software 194 of distributed load balancer 186. The upgrade operations are flexible, rather than monolithic as described above. In examples, a user can selectively perform upgrade operations on different parts of the distributed load balancer 186, such as software 190 exclusive of other software or software 194 exclusive of other software. Further, a user can selected perform upgrade operations for different tenants of distributed load balancer 196 (e.g., on software 194 executing in support VMs 145 dedicated to a particular tenant). Such selective upgrade operations allow the user to apply new software in a sandbox, analyze its behavior, and then increase the sandbox radius. There is no impact on the existing infrastructure. Such selected upgrade operations allow the user to apply new software on a tenant-by-tenant basis based on each tenant's desire and needs (e.g., one tenant requires an upgrade, whereas another tenant does not require the upgrade and does not desire unnecessary upgrades). While the techniques described herein are discussed in reference to a distributed load balancer, such techniques apply to any distributed service in virtualized computing system that can be structured in the same or similar manner, including software distributed throughout host cluster 118 and servicing multiple tenants.

Figure 2:
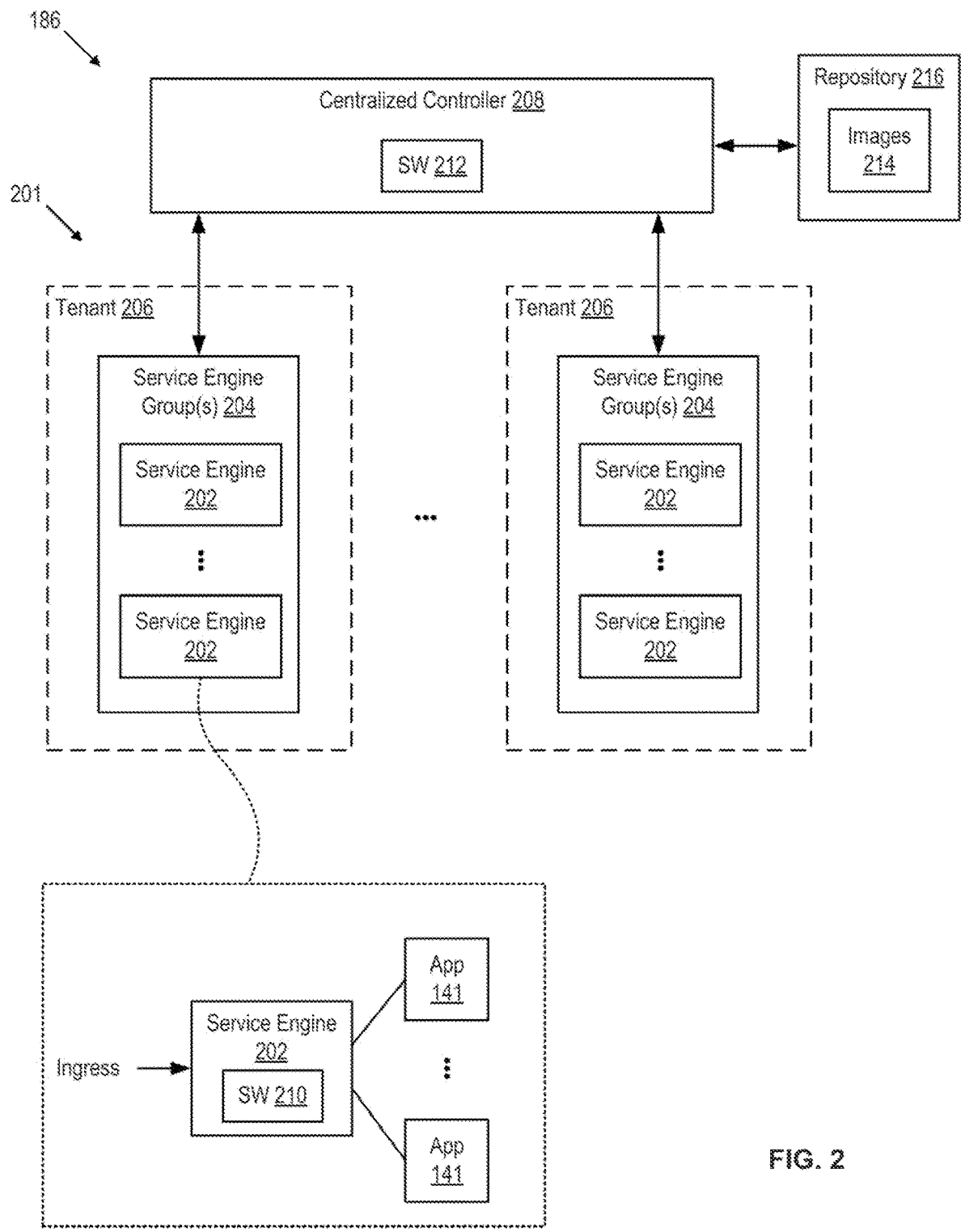
FIG. 2 is a block diagram depicting a distributed load balancer according to an embodiment.

FIG. 2 is a block diagram depicting a distributed load balancer according to an embodiment. Distributed load balancer 186 includes a centralized controller 208 and a plurality of service engine groups (SEGs) 204. Each SEG 204 includes at least one service engine (SE) 202. An SE 202 includes an input for receiving ingress traffic and outputs coupled to a plurality of applications 141. SE 202 performs a load balancing function on behalf of its applications (e.g., load balancing the ingress traffic across the applications). Centralized controller 208 manages a data plane 201 of distributed load balancer 186. Data plane 201 includes SEGs 204. Centralized controller 208 can create, configure, and destroy SEs 202 and SEGs 204 in data plane 201 as well as perform upgrade operations as described herein. Centralized controller 208 can execute on one or more servers, such as one or more VMs (e.g., multiple VMs for high-availability).

SEGs 204 perform the application load balancing in data plane 201. SEs 202 can be logically aggregated into SEGs 204 with different high-availability policies. SEGs 204 can have high-availability policies such as active/active, active/ standby, or M+N HA. SEGs 204 are tenant-aware can be dedicated to particular tenants 206. That is, each tenant 206 of host cluster 118 can have one or more SEGs 204. In embodiments, SEGs 204 execute on VMs (e.g., support VMs 145) in host cluster 118. In other embodiments, SEGs 204 can execute as agents 152 in hypervisor 150 or as a combination of agents 152 and support VMs 145. Centralized controller 208 can be implemented in network manager 112 or as a separate controller.

Centralized controller 208 is implemented by software 212. Each SE 202 is implemented by software 210. Centralized controller 208 is configured for communication with a repository 216 that stores images 214. Images 214 include one or more versions of software 212 and software 210. Images 214 can also include patches for images for software 212 and software 210. Centralized controller 208 is configured to perform upgrade operations on software 212 and software 210 using images 214 in repository 216.

Figure 3:
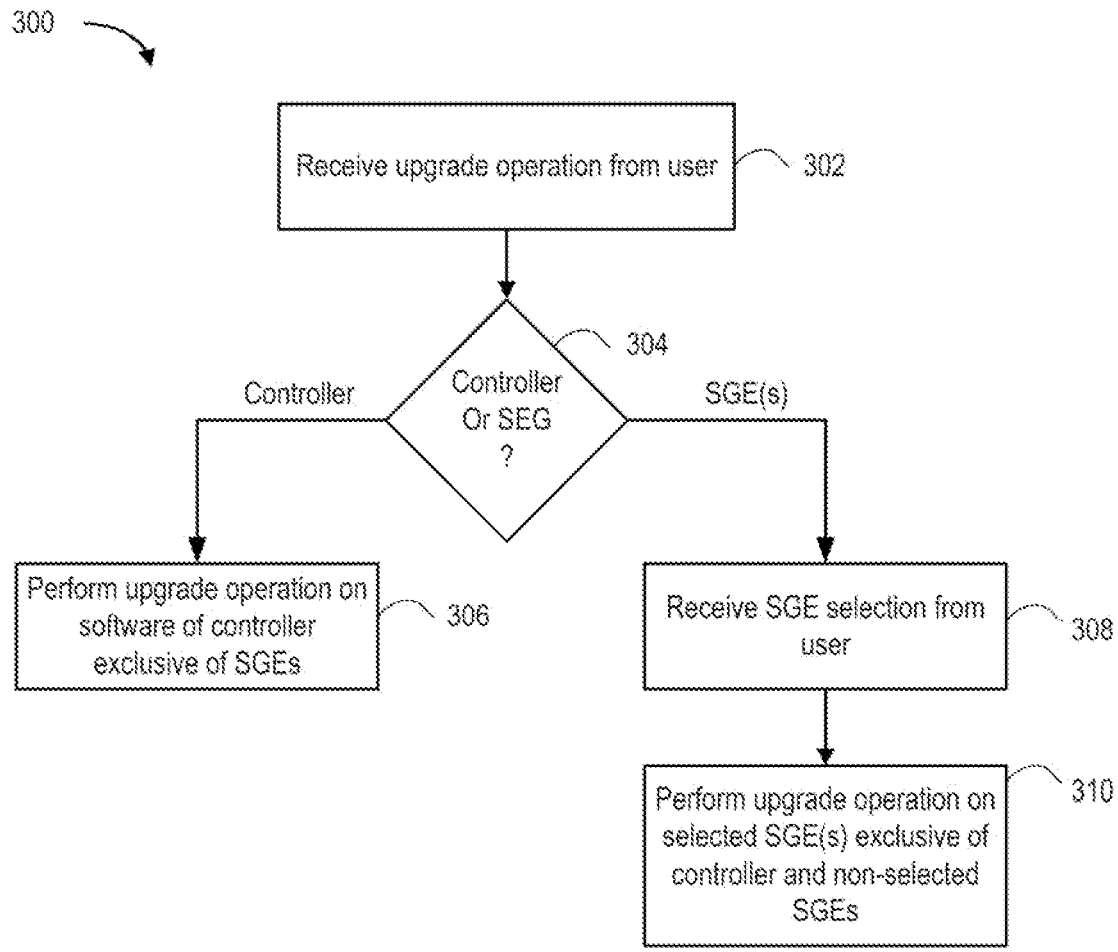
FIG. 3 is a flow diagram depicting a method of performing upgrade operations on a distributed service according to an embodiment.

FIG. 3 is a flow diagram depicting a method 300 of performing upgrade operations on a distributed service according to an embodiment. Method 300 can be understood with respect to distributed load balancer 186 shown in FIG. 2. Method 300 is executed by software 212 of centralized controller 208, Which can be implemented by a VM or physical machine executing instructions on a CPU.

Method 300 begins at step 302, where centralized controller 208 receives an upgrade operation from a user. For example, a user can request an upgrade, a patch, or a rollback of software in distributed load balancer 186 (e.g., software 212 or particular software 210). At step 304, centralized controller 208 determines whether the upgrade operation is for centralized controller 208 or for SGE(s) 204. If for centralized controller 208, method 300 proceeds to step 306. Otherwise, method 300 proceeds to step 308.

At step 306, centralized controller 208 performs an upgrade operation of software 212 exclusive of SGEs 204. That is, centralized controller 208 performs the upgrade operation on software 212, but not on any software 210 in any SE 202. In this manner, software 212 is upgraded, patched, or rolled back without modifying software 210 in any SE 202. For example, software 212 for centralized controller 208 can be upgraded to the next version, while software 210 in each SE 202 remains at its previous version. The upgrade operation in step 306 can be performed on each node of centralized controller 208 while centralized controller 208 executes (e.g., in-place upgrade). Further, data plane 201 continues to execute while the upgrade operation is performed on centralized controller 208 so there is no interruption in traffic load balancing within host cluster 118.

For an SEG upgrade operation, method 300 proceeds to step 308, where centralized controller 208 receives a selection of SGE(s) from the user. The user can select one or more SEGs 204 for the upgrade operation. For example, the user can select all SEGs 204 for a particular tenant 206. At step 310, centralized controller 208 performs the selected upgrade operation on the selected SEG(s) 204 exclusive of centralized controller 208 and non-selected SEG(s) 204. That is, centralized controller 208 performs the upgrade operation (e.g., upgrade, patch, or roll back) on software 210 in selected SEs 202 of the selected SEG(s) 204, but not on software 212 or software 210 in SEs of any non-selected SEGs 204. In this manner, software 210 in SEs 202 of selected SGE(s) 204 is upgraded, patched, or rolled back without modifying software 212 or software 210 in any non-selected SEG 204. For example, software 210 in each SE 202 of a selected SEG 204 can be upgraded to the next version, while software 212 and software 210 in each non-selected SEG 204 remains at its previous version. The upgrade operation in step 308 can be performed on each SE 202 of the selected SEG(s) 204 while centralized controller 208 executes and while non-selected SEGs 204 execute (e.g., in-place upgrade). Further, each selected SEG 204 continues to execute while the upgrade operation is performed thereon so there is no interruption in traffic load balancing for the applications that utilize those SEGs 204.

Figure 4:
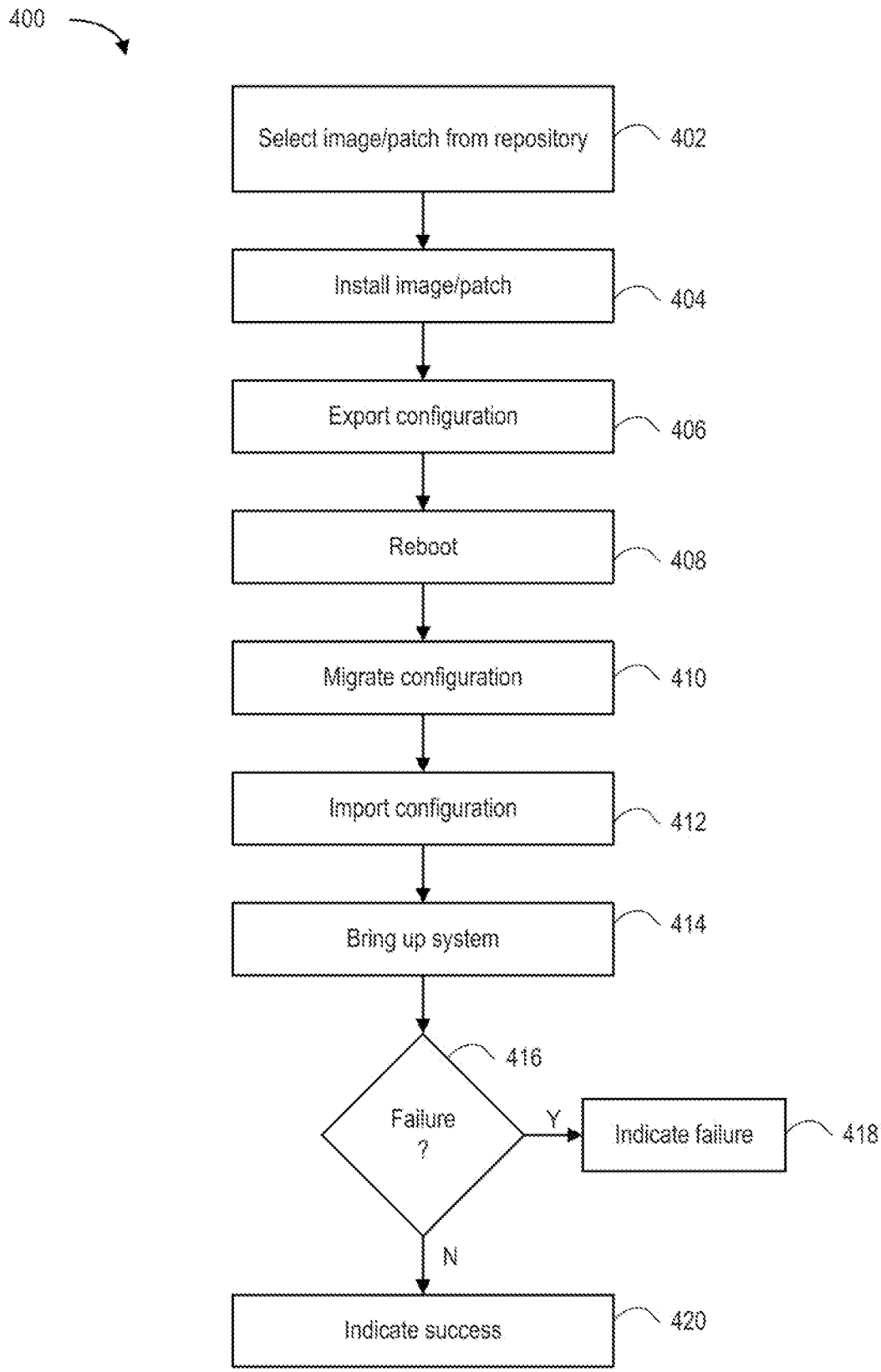
FIG. 4 is a flow diagram depicting a method of performing an upgrade operation on a centralized controller for a distributed service according to an embodiment.

FIG. 4 is a flow diagram depicting a method 400 of performing an upgrade operation on a centralized controller for a distributed service according to an embodiment. Method 400 can be understood with respect to distributed load balancer 186 shown in FIG. 2. Method 400 is executed by software 212 of centralized controller 208, which can be implemented by a VM physical machine executing instructions on a CPU.

Method 400 begins at step 402, where centralized controller 208 selects an image or patch from repository 216. The linage patch targets software 212 in centralized controller 208. At step 404, centralized controller 208 installs the image/patch as an upgrade operation on software 212. At step 406, centralized controller 208 exports the configuration of software 212. The configuration of software 212 includes the various parameters and settings used by load balancer 186 for data plane 201 and for operation of centralized controller 208. At step 408, centralized controller reboots.

At step 410, centralized controller, after reboot, migrates the exported configuration data from the previous version to a new version. For example, an upgrade or patch can necessitate a change in the configuration data of the previous version of software 212. If no change to configuration data is necessary due to the upgrade/patch, method 400 can skip step 410. At step 412, centralized controller 208 imports the configuration data. After import, centralized controller 208 is configured the same or similar to how centralized controller 208 was previously configured for the prior version of software 212. At step 414, centralized controller 208 becomes active and serves requests from users. At step 416, centralized controller 208 determines if there was a failure at any of steps 402-414. If so, method 400 proceeds to step 418, where centralized controller 208 indicates the failure to the user. Otherwise, method 400 proceeds to step 420 and indicates success to the user.

While method 400 has been described with respect to an upgrade operation of upgrade or patch, it is to be understood that the method can also apply to an upgrade operation of roll back. In such case, a roll back is applied, which can optionally require migration of configuration data from one version to the rolled back version.

Figure 5:
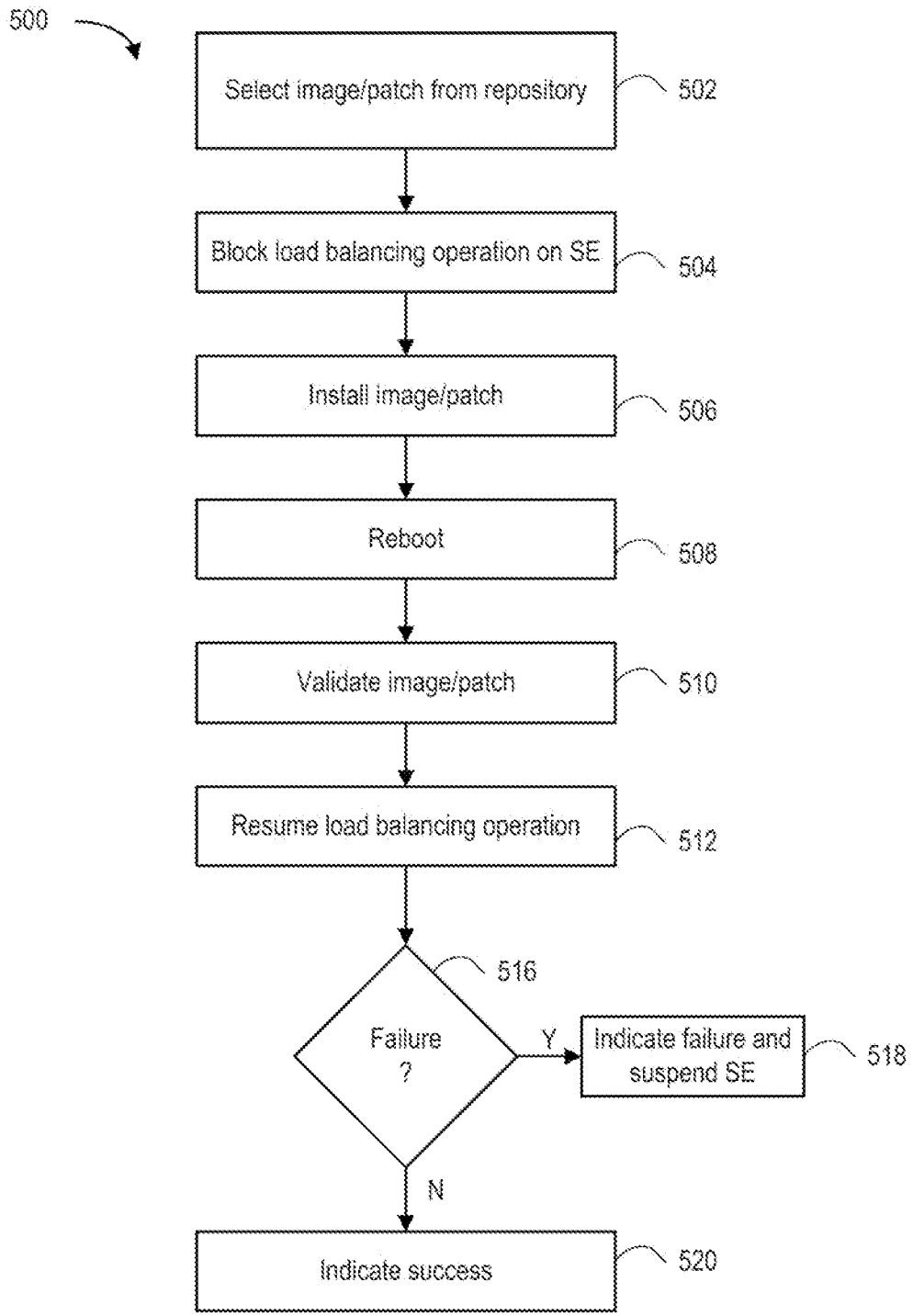
FIG. 5 is a flow diagram depicting a method of performing an upgrade operation on a service engine for a distributed service according to an embodiment.

FIG. 5 is a flow diagram depicting a method 500 of performing an upgrade operation on a service engine for a distributed service according to an embodiment. Method 500 can be understood with respect to distributed load balancer 186 shown in FIG. 2. Method 500 is executed by software 210 of a service engine 202, which can be implemented by VM or physical machine executing instructions on a. CPU.

Method 500 begins at step 502, where centralized controller 208 selects an image or patch from repository 216, The image/patch targets software 210 for SEs 202 of an SEG 204 being upgraded/patched. At step 504, an SE 202 blocks its load balancing operation during the upgrade operation. Other SEs 202 in the SEG 204 continue to operate and perform load balancing. At step 506, SE 202 install the upgrade/patch. At step 508, SE 202 reboots. At step 509, SE 202 validates the image/patch applied to software 210 to ensure functionality (e.g., a self test). At step 512, SE 202 resumes the load balancing operation for its applications. At step 516, SE 202 determines if there was a failure at any of steps 502-512. If so, method 500 proceeds to step 518, where SE 202 indicates a failure and suspends operation. Otherwise, method 500 proceeds to step 520, where SE 202 indicates success.

While method 500 has been described with respect to an upgrade operation of upgrade or patch, it is to be understood that the method can also apply to an upgrade operation of roll back. Further, method 500 can be repeated for each SE 202 in an SEG 404 targeted for the upgrade operation. The upgrade operation for SEs 202 in an SEG 404 can be staggered so that not all SEs 202 block load balancing at the same time.

The embodiments described herein may employ various computer-implemented operations involving data stored in computer systems. For example, these operations may require physical manipulation of physical quantities. Usually, though not necessarily, these quantities may take the form of electrical or magnetic signals, where the quantities or representations of the quantities can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Virtualization systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method of performing an upgrade operation for a distributed service in a virtualized computing system serving a plurality of tenants, each of the plurality of tenants having an application deployed in the virtualized computing system utilizing the distributed service, the virtualized computing system including a host cluster, the host cluster having hosts and a virtualization layer, executing on hardware platforms of the hosts, supporting virtual machines (VMs), the method comprising:

receiving, at a controller of the distributed service, a first upgrade operation from a user, the distributed service including the controller and a plurality of service engine groups, the plurality of service engine groups comprising a data plane of the distributed service, the controller comprising a control plane of the distributed service that manages the data plane, each of the plurality of service engine groups associated with one of the plurality of tenants and including a plurality of service engines;

performing, by the controller, the first upgrade operation on software of the controller exclusive of software of the plurality of service engines in each of the plurality of service engine groups, the software of the controller executing in at least one host, the software of the plurality of service engines in each of the plurality of service engine groups executing in a plurality of hosts, the first upgrade upgrading the control plane while the data plane executes;

receiving, at the controller of the distributed service, a second upgrade operation from the user, the second upgrade operation selecting a service engine group of the plurality of service engine groups for a first tenant of the plurality of tenants; and performing, by the controller in cooperation with the plurality of service engines of the selected service engine group, the second upgrade operation on the software of the plurality of service engines of the selected service engine group exclusive of the software of the controller and the software of those service engine groups associated with each of the plurality of tenants other than the first tenant;

wherein at least a portion of the software of the plurality of service engines in each of the plurality of service engine groups further executes in the virtualization layer on the hardware platforms external to the VMs.

2. The method of claim 1, wherein, for each service engine of the plurality of service engines for the selected service engine group, the step of performing comprises:
blocking a function of the service engine;
performing the second upgrade operation; and
resuming the function of the service engine.

3. The method of claim 1, wherein the step of performing comprises:
performing an upgrade, a patch, or a roll back on the software of the controller;
exporting a configuration of the controller;
rebooting the controller;
importing the configuration of the controller; and
activating the controller.

4. The method of claim 3, wherein the step of performing comprises:
migrating the configuration of the controller from a first version to a second version prior to importing the configuration of the controller.

5. The method of claim 1, wherein the first upgrade operation comprises one of an upgrade, a patch, or a roll back for the software of the controller.

6. The method of claim 1, wherein the distributed service comprises a distributed load balancer, and wherein each of the plurality of service engines in the plurality of service engine groups includes an input to receive ingress traffic and outputs coupled to a plurality of applications.

7. The method of claim 1, wherein after the second upgrade operation, the software of the selected service engine group for the first tenant is at a second version and the software of another service engine group for a second tenant is at a first version different than the second version.

8. A non-transitory computer readable medium comprising instructions to be executed in a computing device to cause the computing device to carry out a method of performing an upgrade operation for a distributed service in a virtualized computing system serving a plurality of tenants, each of the plurality of tenants having an application deployed in the virtualized computing system utilizing the distributed service, the virtualized computing system including a host cluster, the host cluster having hosts and a virtualization layer, executing on hardware platforms of the hosts, supporting virtual machines (VMs), the method comprising:
receiving, at a controller of the distributed service, a first upgrade operation from a user, the distributed service including the controller and a plurality of service engine groups, the plurality of service engine groups comprising a data plane of the distributed service, the controller comprising a control plane of the distributed service that manages the data plane, each of the plurality of service engine groups associated with one of the plurality of tenants and including a plurality of service engines;
performing, by the controller, the first upgrade operation on software of the controller exclusive of software of the plurality of service engines in each of the plurality of service engine groups, the software of the controller executing in at least one host, the software of the plurality of service engines in each of the plurality of service engine groups executing in a plurality of hosts, the first upgrade upgrading the control plane while the data plane executes;
receiving, at the controller of the distributed service, a second upgrade operation from the user, the second upgrade operation selecting a service engine group of the plurality of service engine groups for a first tenant of the plurality of tenants; and
performing, by the controller in cooperation with the plurality of service engines of the selected service engine group, the second upgrade operation on the software of the plurality of service engines of the selected service engine group exclusive of the software of the controller and the software of those service engine groups associated with each of the plurality of tenants other than the first tenant;
wherein at least a portion of the software of the plurality of service engines in each of the plurality of service engine groups further executes in the virtualization layer on the hardware platforms external to the VMs.

9. The non-transitory computer readable medium of claim 8, wherein, for each service engine of the plurality of service engines for the selected service engine group, the step of performing comprises:
blocking a function of the service engine;
performing the second upgrade operation; and
resuming the function of the service engine.

10. The non-transitory computer readable medium of claim 8, wherein the step of performing comprises:
performing an upgrade, a patch, or a roll back on the software of the controller;
exporting a configuration of the controller;
rebooting the controller;
importing the configuration of the controller; and
activating the controller.

11. The non-transitory computer readable medium of claim 10, wherein the step of performing comprises:
migrating the configuration of the controller from a first version to a second version prior to importing the configuration of the controller.

12. The non-transitory computer readable medium of claim 8, wherein the first upgrade operation comprises one of an upgrade, a patch, or a roll back for the software of the controller.

13. A virtualized computing system, comprising:
a host cluster including hosts and a virtualization layer executing on hardware platforms of the hosts, the virtualization layer supporting virtual machines (VMs), the host cluster serving a plurality of tenants, each of the plurality of tenants having an application deployed therein utilizing a distributed service;
the distributed service comprising a controller and a plurality of service engine groups, the plurality of service engine groups comprising a data plane of the distributed service, the controller comprising a control plane of the distributed service that manages the data plane, each of the plurality of service engine groups associated with one of the plurality of tenants and comprising a plurality of service engines; and
the controller configured to:
receive a first upgrade operation from a user; and
perform the first upgrade operation on software of the controller exclusive of software of the plurality of service engines in each of the plurality of service engine groups, the first upgrade upgrading the control plane while the data plane executes;

receive a second upgrade operation from the user, the second upgrade operation selecting a service engine group of the plurality of service engine groups; and perform, by the controller in cooperation with the plurality of service engines of the selected service engine group, the second upgrade operation on the software of the plurality of service engines of the selected service engine group exclusive of the software of the controller and the software of those service engine groups associated with each of the plurality of tenants other than the first tenant;

wherein at least a portion of the software of the plurality of service engines in each of the plurality of service engine groups further executes in the virtualization layer on the hardware platforms external to the VMs.

14. The virtualized computing system of claim 13, wherein, for each service engine of the plurality of service engines for the selected service engine group, the controller is configured to perform the second upgrade operation by:

blocking a function of the service engine;

performing the second upgrade operation; and resuming the function of the service engine.

15. The virtualized computing system of claim 13, wherein the controller is configured to perform the first upgrade operation by:

performing an upgrade, a patch, or a roll back on the software of the controller;

exporting a configuration of the controller;

rebooting the controller;

importing the configuration of the controller; and activating the controller.

16. The virtualized computing system of claim 15, wherein the controller is configured to perform the first upgrade operation by:

migrating the configuration of the controller from a first version to a second version prior to importing the configuration of the controller.

17. The virtualized computing system of claim 13, wherein the first upgrade operation comprises one of an upgrade, a patch, or a roll back for the software of the controller.

* * * * *